Feb. 11, 1969    C. E. BRADY ET AL    3,426,785
POWER STEERING FLOW CONTROL DEVICE
Filed Dec. 1, 1966                    Sheet 1 of 2
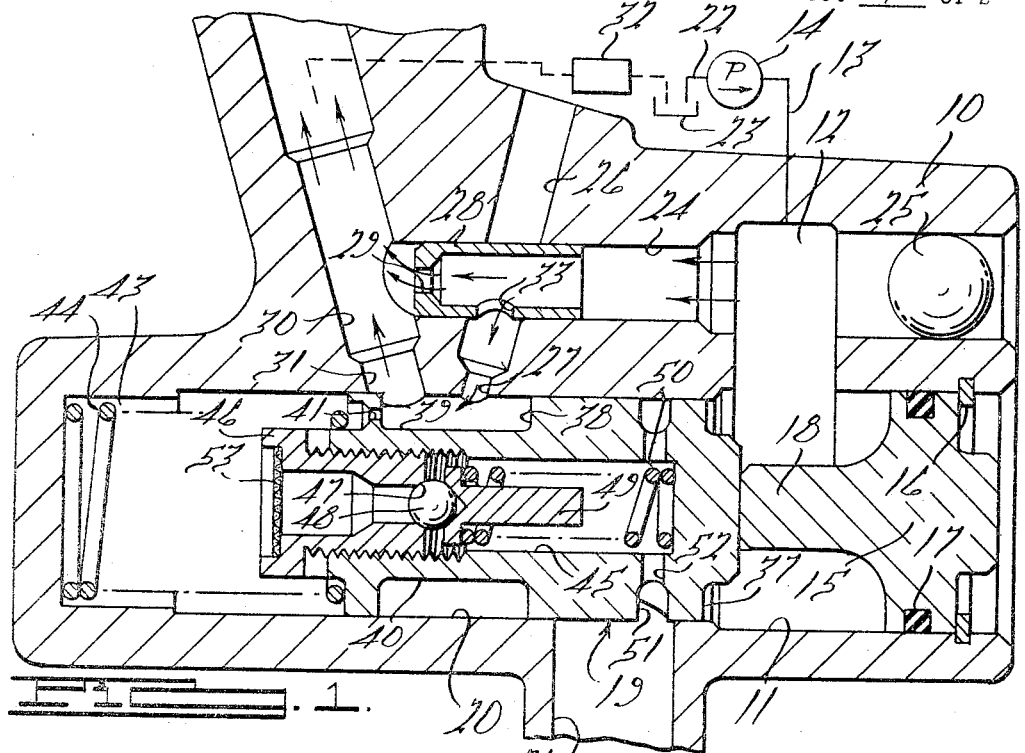
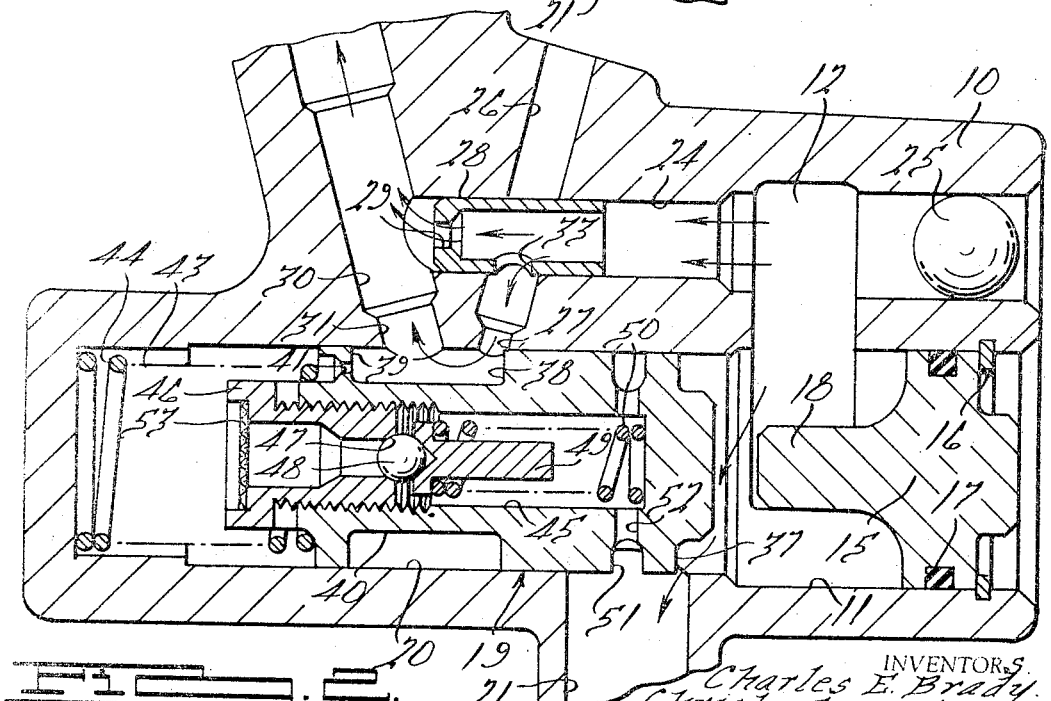
INVENTORS.
Charles E. Brady
Christopher Nuss
BY
Harness, Talbott & Baldwin
ATTORNEYS INVENTORS
Charles E. Brady
Christopher Nuss
BY
Harness, Talburtt & Baldwin
ATTORNEYS 3,426,785
POWER STEERING FLOW CONTROL DEVICE
Charles E. Brady, Bloomfield Hills, and Christopher Nuss, Warren, Mich., assignors to Chrysler Corporation, Highland Park, Mich., a corporation of Delaware
Filed Dec. 1, 1966, Ser. No. 598,236
U.S. Cl. 137—117                                    11 Claims
Int. Cl. F15b 9/08

ABSTRACT OF THE DISCLOSURE

A fluid flow control device for an automobile power steering gear comprises a pressure operated valve spool shiftable axially in a housing having a valve port and a bypass port connected respectively with a pump outlet and inlet. A bypass land on the spool controls bypass flow from the pump outlet to the pump inlet in excess of the steering requirements. The pump outlet also communicates with an upstream surface area of the spool to urge axial bypass opening movement of the latter to increase the bypass flow between the valve port and bypass port, and communicates via a metering orifice and a parallel second orifice with the high pressure side of the steering gear. The latter also communicates with a downstream surface area of the spool via a restricted trigger orifice to cooperate with a valve biasing spring to oppose said bypass opening movement, such that the pressure differential across the metering orifice is a constant determined by the reaction of the biasing spring. A second land on the valve spool operates to restrict the second orifice and thereby reduce the fluid flow to the steering gear upon said bypass opening movement corresponding to a predetermined high speed operation of the pump. A pressure relief valve in communication with said downstream surface area operates to exhaust fluid pressure therefrom at a predetermined maximum safe operating pressure, whereby in consequence of the restricted trigger orifice, a small pressure relief flow from the downstream surface area results in a large pressure drop thereat and a corresponding large increase in said bypass flow.

---

This invention relates to improvements in a fluid flow control device particularly adapted for use in metering the rate of flow of pressurized fluid to a hydraulically actuated power steering gear for an automobile and which in particular achieves a two stage flow control effective to reduce the pressurized flow to the steering gear at high vehicle engine speeds, in combination with a simple integral trigger action type pressure relief valve.

It is customary to supply pressurized fluid to an automobile power steering gear by means of a pump driven by the automobile engine, such that the pump is operated at maximum speed and is capable of delivering its maximum power when the automobile is cruising at high speed along the highways. The power steering gear on the other hand is ordinarily under maximum load and requires maximum power from the pump when the automobile is operating at low speeds, as for example during a parking maneuver. In order to minimize heating of the pressurized fluid, it has been customary to strive for a "drooper" effect in the rate of flow of the fluid to the steering gear, such that as the vehicle engine speed increases, the rate of flow of pressurized fluid decreases.

It is an object of the present invention to provide an improved flow control device of the above-mentioned type for an automotive steering gear which supplies pressurized fluid to the gear at a comparatively high constant rate of flow during engine operation at slow to moderate speeds, and at an appreciably reduced constant rate of flow during high speed engine operation.

With the advent of more powerful automobile engines and higher operating speeds, power steering pumps capable of supplying hydraulic fluid at pressures in the neighborhood of 800 to 1500 p.s.i. have become common for the sake of increased operating efficiency, reliability, and safety. The use of high pressure power steering pumps introduces various problems relating to noise in the hydraulic system and overheating of the pressurized fluid, which in turn necessitate more costly, precise, and complex parts, such as complex precision valves to minimize valve chattering and other noises, and costly flexible hose conduits capable of withstanding the high temperatures involved, by way of example.

Other objects are accordingly to provide a power steering flow control device of the above character which is particularly responsive to the steering load and which reacts rapidly to changes in the steering load, which is characterized by low friction in the fluid circuit, whereby frictional heating of the pressurized fluid is minimized, and which is of comparatively simple, compact construction susceptible of economical manufacture, thereby to avoid for example such complex and expensive structures as a metering rod and the difficulty of maintaining the same in concentric alignment with a metering orifice to obtain consistent flow control characteristics in mass produced valves.

Other objects are to provide such a flow control device having a sharp "drooper" or two stage action wherein the rate of flow of pressurized working fluid to the gear drops sharply above a predetermined engine speed, in combination with a particularly simple and economically manufactured trigger type pressure relief valve capable of operation at small volume above a predetermined high pressure to trigger large volume pressure relief operation of the flow control device and prevent development of excessive pressure in the system. By such a construction, a comparatively small economical pressure relief valve can be employed to discharge quietly a relatively small volume of hydraulic fluid at the predetermined high pressure, thereby to trigger operation of the larger and more costly flow control device which is capable of quietly and efficiently exhausting the entire fluid output of the power steering pump if desired.

Another and more specific object is to provide such a flow control device comprising a tubular valve bore in a valve housing having a pressure actuated spool valve shiftable axially therein and also having a valve port and a bypass port connected respectively with the high pressure pump outlet and low pressure pump inlet. Communication between the high pressure valve port and the bypass port is controlled by a bypass land on the valve spool, so as to provide a bypass flow to the pump inlet for the fluid output of the pump in excess of the requirements of the steering gear. The valve port opens into the valve bore at a location in communication with an upstream surface area of the valve spool to urge the latter in the direction of opening of the communication between the valve port and bypass port and in opposition to fluid pressure in communication with a downstream surface area of the valve spool.

A first or primary passage for working fluid has an upstream end in communication with the pump outlet and upstream surface area of the spool valve and has a delivery end in communication with both the steering gear to actuate the latter and with the downstream surface area of the spool valve. Metered fluid flow to the steering gear is provided through a first metering restriction located in the first passage between its upstream end and delivery end, whereby the fluid pressure differential across the first metering restriction is applied to said upstream and downstream areas of the valve spool to actuate the latter. Valve biasing means cooperates with the fluid pressure at the downstream area of the valve spool to urge the latter in the direction to close the bypass flow from the pump outlet to the bypass port. Thus in a preferred embodiment of the invention where the effective upstream and downstream areas of the valve spool are equal, the pressure drop or differential across the first metering restriction will be a constant equal to the pressure exerted by the biasing means. Operation of the steering gear tending to vary this pressure differential will cause shifting of the spool valve to maintain the pressure differential constant as determined by the valve biasing means.

A restricted secondary metering passage for working fluid has its upstream and downstream ends in communication with the upstream end and delivery end respectively of the first passage, thereby to provide a restricted partial bypass around the first metering restriction during low speed operating conditions. In the latter regard, the secondary passage extends from the upstream end of the first passage to the latter's delivery end via a portion of the valve bore, whereby fluid flow in the secondary passage is controlled by a secondary land of the valve spool which restricts the secondary passage sharply when the pump output at low pressure exceeds a predetermined rate, i.e. at a predetermined high speed operation of the vehicle. Accordingly at the aforesaid high speed condition of operation, the flow of working fluid to the steering gear is reduced by the amount that the flow in the secondary passage is reduced.

In a preferred embodiment, fluid pressure is communicated to the downstream area of the valve spool only by a restricted trigger orifice connected with the delivery end of the first passage. A pressure relief valve also in communication with said downstream area is adapted to exhaust fluid pressure therefrom when the pressure transmitted thereto through the trigger orifice from the delivery end of the first passage exceeds a predetermined value, i.e. when the pressure at the steering gear reaches the upper limit for safety. It is apparent that when the relief valve exhausts a small volume of comparatively incompressible hydraulic fluid from the region in communication with the downstream surface area, the restricted flow through the trigger orifice will result in a comparatively large pressure loss at the downstream area and a corresponding movement of the spool valve to increase the communication between the pump outlet and bypass port. Thus a slight fluid flow through the pressure relief valve will efficiently trigger a comparatively large bypass flow from the pump outlet and prevent an unsafe high pressure in the system.

Other specific objects are to provide the trigger orifice in a land of the spool valve which is located downstream of the restriction in the secondary passage and which separates the downstream surface area of the spool valve from the portion of the valve bore that comprises part of the restricted secondary passage, and to locate the pressure relief valve within an axial bore of the spool valve. The latter bore is connected at its opposite ends respectively with the pressure at the downstream surface area of the spool valve and with the bypass port. The pressure relief valve may thus comprise a simple spring loaded ball check valve normally blocking communication between the opposite ends of the axial bore in the spool valve until the aforesaid upper safe limit of pressure is attained at said downstream area.

Other objects of this invention will appear in the following description and appended claims, reference being had to the accompanying drawings forming a part of this specification wherein like reference characters designate corresponding parts in the several views.

FIG. 1 is a schematic view of the present invention, showing the flow control device in an operating condition corresponding to minimum engine idle speed.

FIG. 2 is a view similar to FIG. 1, showing the bypass port partially open at an operating condition corresponding to moderate engine cruising speeds.

Figure 3:
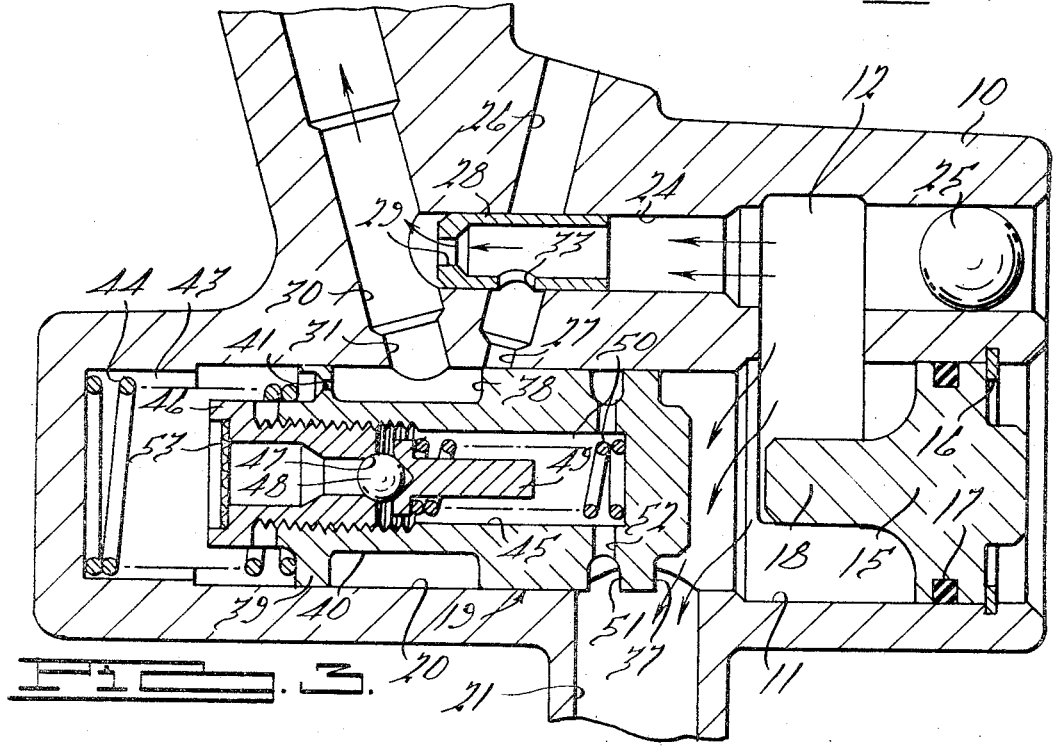
FIG. 3 is a view similar to FIG. 1, showing the secondary passage closed at an operating condition corresponding to high speed engine operation.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a preferred embodiment of the invention is illustrated by way of example in a flow control device for an automotive power steering gear. A cast housing 10 provides a valve bore 11 in communication at its upstream end with a valve port 12, which in turn is connected with the outlet 13 of a high pressure engine driven hydraulic pump 14 for receiving pressurized fluid therefrom. The bore 11 extends into the housing 10 from one end which is sealed by a closure 15 retained in place by a C-ring 16 partially embedded in the housing side wall. A seal 17 around the periphery of the closure 15 prevents endwise leakage of the fluid from the housing 10. Extending inwardly as an integral portion of the closure 15 is a stop 18 adapted to limit rightward movement of a valve spool 19 shiftable axially within a smooth cylindrical portion 20 of the bore 11.

A bypass port 21 opens into the bore portion 20 near its upstream end and is preferably connected with the inlet 22 of the pump 14 for supercharging the inlet flow into the latter from a fluid reservoir 23 in accordance with conventional practice. A first or primary passage 24 for pressurized working fluid is bored into the housing 10 through the valve port 12 to communicate with the later and to receive the pressurized output fluid from the pump 14. The open end of the bore 24 in the housing 10 is sealed by a spherical closure 25 tightly pressed therein.

A second bore 26 in the housing 10 intersects the bore 24 downstream of the valve port 12 and communicates with the valve bore 20 at a secondary port 27. A tubular fitting 28 extends coaxially within the bore 24 to provide a closure for the radially outer portion of the bore 26 and also to provide a first restricted metering orifice 29 which opens axially endwise into a delivery passage 30. A portion of the latter is bored into the housing 10 and communicates with valve bore 20 at a delivery port 31 downstream of the secondary port 27. The delivery passage 30 extends to the hydraulic motor 32 of the power steering gear to supply pressurized working fluid thereto in a conventional manner, the exhaust fluid from the motor 32 being discharged into the reservoir 23 as indicated. The tubular insert 28 is also provided with a restricted lateral metering orifice 33 opening into the portion of bore 26 which in turn opens at 27 into the valve bore 20.

The valve spool 19 is provided with an annular bypass land 37 at its upstream end for controlling the communication between the valve port 12 and bypass port 21 in accordance with axial shifting of the spool 19 as described below. Similarly a second annular land 38 of the spool 19 controls the opening of the secondary port 27 into the valve bore 20. An annular third or guide land 39 spaced from the land 38 by an annular recess 40 serves as a guide for the spool 19 in bore 20 and is provided with a restricted trigger orifice 41 extending axially therethrough into a downstream chamber portion 43 of the bore 11. A valve biasing spring 44 seated at its opposite ends against the closed end of bore 11 and the guideland 39 urges the spool 19 rightward against the stop 18 with a substantially constant force within the range of movement permitted.

It is apparent from the construction shown that the high pressure directed against the upstream end surface area of the spool valve 19 is balanced by the combined forces of the spring 44 and the pressure in the downstream chamber 43 against the downstream end surface area of the spool 19, such that a constant pressure differential across orifice 29 is maintained as determined by the pressure of spring 44. In the event that the pressure differential across the metering orifice 29 tends to vary, the valve spool 19 will shift correspondingly to increase or decrease the comunication of bypass 21 with the valve port 12. In consequence of the constant pressure differential across metering restriction or orifice 29, a constant flow of working fluid into the delivery passage 30 and to the motor 32 will be supplied at all times during operation of the pump at moderate engine speeds as described below, regardless of the pressure in passage 30 determined by the power demands of the motor 32. It is also to be noted that a secondary restricted passage through restriction or orifice 33, port 27, and port 31 provides a limited bypass flow of the working fluid around the restriction 29 into delivery passage 30 during operation at moderate engine speeds. Obviously the pressure differential across the secondary restricted passage will be the same as the pressure differential across the parallel orifice 29.

Figure 4:
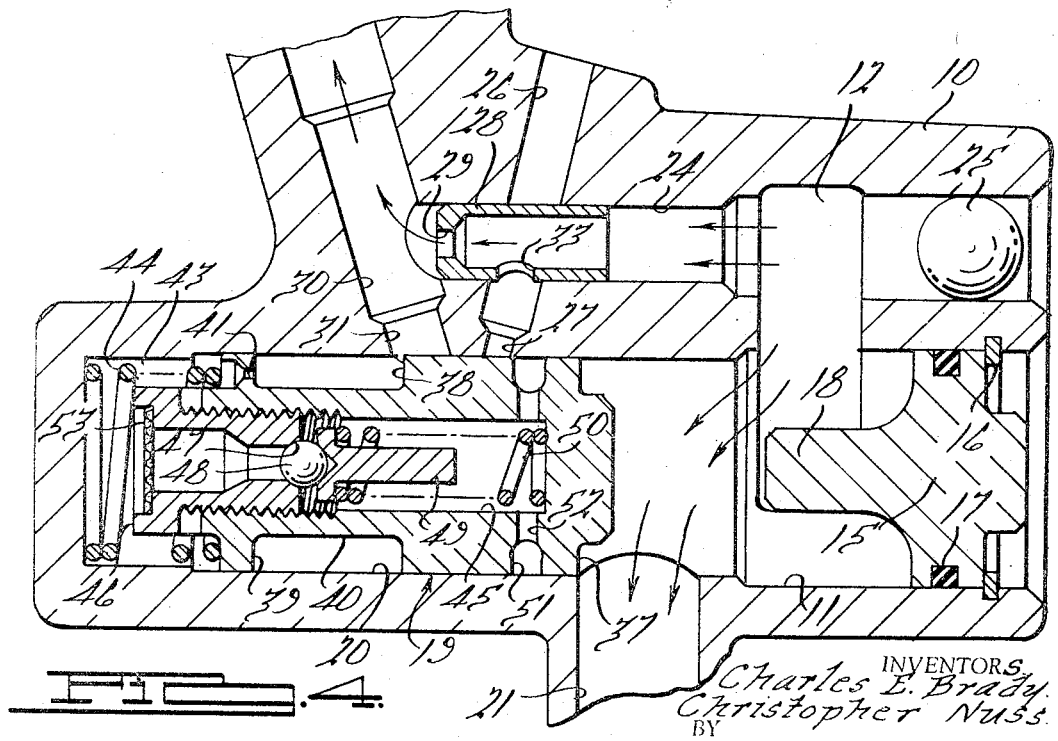
FIG. 4 is a view similar to FIG. 1, showing the bypass port wide open and the secondary passage closed at an operating condition corresponding to nearly maximum engine speed.

In a typical power steering gear the combined flow through restrictions 33 and 29 will be in the neighborhood of approximately 2.7 gals per minute when port 27 is open as in FIGURES 1 and 2. The excess pump output will be bypassed into port 21 upon leftward shifting of valve spool 19. During high speed operation of the vehicle engine and increased pump output as illustrated in FIGURES 3 and 4, port 27 is closed by land 38 upon leftward movement of spool valve 19. Thus at high vehicle speeds ordinarily above 60 m.p.h. when the power requirements of the motor 32 are at a minimum, the flow of working fluid into delivery passage 30 is reduced sharply to approximately 1.5 gals. per minute by the closing of the secondary passage through port 27.

During the operation described thus far, there is no fluid flow through trigger orifice 41 except to accommodate transistory shifting of valve 19, whereupon orifice 41 effects a dash-pot action to damp sudden valve movements. Accordingly, the fluid pressure in the downstream chamber 43 will usually be substantially the same as the pressure of the working fluid in delivery passage 30.

In order to prevent the development of an unsafe pressure in the delivery conduit or passage 30 in the event of an excessive power demand by the motor 32, a fluid pressure relief system is provided comprising a coaxial bore 45 in the spool 19, which opens into chamber 43. A tubular valve insert 46 secured within the open end of bore 45 is provided with an annular valve seat 47 at its inner end for a ball check valve 48. The latter is maintained in a seated position against the seat 47 to close the bore 45 by means of a spring retainer 49 urged leftward against the ball 48 by a spring 50 seated under compression against a flange of the retainer 49 and the closed right end of bore 45. An annular recess 51 in the outer periphery of spool 19 communicates with the bypass port 21 and is in turn connected with the bore 45 by a plurality of radial bores 52 to discharge fluid from the chamber 43 into bypass port 21 upon opening or unseating of valve 48 against the force of spring 50 in response to pressure at an upper limit in chamber 43.

Upon the unseating of valve 48, a small quantity of fluid will be discharged into bypass 21 through bore 45. By virtue of the restriction of trigger orifice 41, the pressure in downstream chamber 43 will be immediately reduced to enable leftward shifting of valve spool 19, thereby to increase the opening of bypass port 21. In consequence, a comparatively insignificant fluid flow around check valve 48 can result in a comparatively large rate of increase in the bypass flow around land 37, whereby a comparatively simple and economical ball valve 48 may be feasibly employed without inducing an undesirable valve noise during pressure relief operation that would otherwise result if the entire pressure relief flow were passed through the pressure relief valve. Also in the structure just described, the trigger orifice 41 is removed from the direct flow of working fluid to the motor 32, so that freedom in the selection of the desired size of orifice 41 is assured and frictional resistance to the fluid flow and heating of the hydraulic fluid are minimized.

We claim:
1. In a power steering system,
 (a) a pump having an inlet and an outlet,
 (b) first working fluid passage means having an upstream end in communication with said outlet for receiving working fluid therefrom and having a delivery end for supplying said working fluid to a hydraulic motor,
 (c) means for metering the flow of said working fluid to said delivery end including
  (1) first metering restriction means in said first working fluid passage means for metering the flow of working fluid therein and
  (2) valve controlled secondary fluid passage means for said working fluid having upstream and downstream ends in communication with said first working fluid passage means at locations upstream and downstream respectively of said first metering restriction means for partially bypassing the latter,
 (d) flow restricting means including secondary metering restriction means in said secondary passage means for metering the flow of working fluid therein,
 (e) means for exhausting excess fluid from said outlet comprising
  (1) a bypass port,
 (f) means cooperable with said metering restriction means for maintaining a substantially constant rate of flow of working fluid to said delivery end when the output of said pump is less than a predetermined value comprising
  (1) pressure actuated flow control valve means responsive to the fluid output of said pump for controlling the communication between said outlet and bypass port,
 (g) and means comprising part of said valve means for reducing the flow of working fluid to said delivery end to less than said substantially constant rate when said pump output exceeds said predetermined value comprising
  (1) secondary fluid control means for restricting said secondary passage means when said pump output exceeds said predetermined value.

2. In a power steering system according to claim 1, a housing having a bore therein comprising a portion of said working fluid passage means, a tubular insert in said bore having a first restricted metering orifice comprising said first metering restriction means and having a second restricted metering orifice comprising said secondary metering restriction means.

3. In the combination according to claim 2, said first working fluid passage means and secondary passage means including first and second intersecting bores respectively in said housing, said tubular insert being located in said bores at their intersection coaxially with said first bore and having said first metering orifice opening axially endwise into said first bore and having said second metering orifice in its sidewall opening into said second bore.

4. In the combination according to claim 1,
 (1) a housing,
 (2) a valve chamber in said housing,
 (3) a valve port in communication with said pump outlet and opening into said chamber to supply pump output fluid thereinto,
  (a) said bypass port opening into said chamber at a location spaced from said valve port to receive said pump output fluid from said chamber,
 (4) a shiftable valve element in said chamber responsive to the fluid output of said pump for shifting to control the communication between said valve port and bypass port,
  (a) said valve element and chamber comprising said valve means,
  (b) said chamber comprising a portion of said secondary passage means and having an upstream secondary fluid port in communication with said upstream end of said secondary passage means for conducting fluid therefrom into said chamber, and
  (c) said secondary fluid flow control means comprising a portion of said valve element shiftable therewith in response to said pump output in excess of said predetermined value for restricting said upstream secondary fluid port.

5. In the combination according to claim 4,
 (1) said valve element having an upstream surface area subject to the fluid pressure at said valve port for moving said valve element in the direction to open communication between said valve port and bypass port,
 (2) said valve element having a downstream surface area subject to the fluid pressure in a downstream portion of said chamber for opposing the pressure on said upstream surface area and moving said valve element in the opposite direction to close communication between said valve port and bypass port,
 (3) said flow restricting means comprising the sole means for communicating fluid pressure to said downstream surface and including trigger orifice means connecting the delivery end of said fluid passage means with said downstream chamber portion,
 (4) and pressure relief valve means responsive to a predetermined fluid pressure in said downstream chamber portion for discharging fluid therefrom to reduce the pressure therein.

6. In the combination according to claim 5, said flow control valve means comprising means for maintaining a substantially constant differential between the pressures on said upstream and downstream surface areas during equilibrium operating conditions.

7. In the combination according to claim 6, said valve element comprising a spool valve element shiftably axially in a cylindrical bore portion of said valve chamber and having said upstream and downstream surface areas spaced axially, said valve chamber having a secondary downstream port opening therein and communicating with said delivery end of said fluid passage means, said valve element having a land separating said downstream portion of said chamber from said secondary downstream port, and said trigger orifice means comprising a restricted orifice in the last-named land to retard the rate of fluid flow into said downstream chamber portion upon operation of said pressure relief valve means to reduce the pressure in said downstream chamber portion.

8. In the combination according to claim 1,
 (1) a housing having
  (a) a valve bore therein,
 (2) said valve means comprising
  (a) a spool valve element shiftable axially within said valve bore,
 (3) a valve port in communication with said pump outlet to receive pressurized fluid therefrom and opening into said valve bore to discharge said fluid thereinto,
 (4) said bypass port opening into said bore to receive said fluid therefrom,
 (5) said valve element having
  (a) a bypass land for controlling the communication between said valve port and bypass port upon shifting of said valve element,
  (b) an upstream surface area subject to the fluid pressure at said valve port for moving said valve element in one direction to increase the communication between said valve port and bypass port, and
  (c) a downstream surface area subject to the fluid pressure in a downstream portion of said valve bore for opposing the pressure at said upstream surface area and moving said valve element in the opposite direction to decrease the communication between said valve port and bypass port,
 (6) an intermediate portion of said bore comprising a portion of said secondary passage means,
 (7) said housing having upstream and downstream secondary ports opening into said intermediate bore portion and communicating respectively
  (a) with said secondary passage means for conducting fluid therefrom into said intermediate bore portion and
  (b) with said delivery end at said downstream end of said secondary passage means for discharging said fluid thereinto downstream of said first metering restriction means,
 (8) said valve element having
  (a) a secondary land for progressively restricting said upstream secondary port upon predetermined shifting of said valve element in said one direction and
  (b) a third land separating said downstream secondary port from said downstream portion of said bore,
 (9) means providing a restricted communication between said downstream portion of said bore and said delivery end of said passage means comprising
  (a) trigger orifice means in said third land, and
 (10) pressure relief valve means responsive to a predetermined fluid pressure in said downstream bore portion for discharging fluid therefrom to reduce the pressure therein and thereby to enable increased movement of said valve element in said one direction to increase the communication between said pump outlet and bypass port.

9. In the combination according to claim 8, said intermediate bore portion being spaced between said secondary land and third land, said valve element having a relief valve bore opening at one end into said downstream bore portion, a vent port in said valve element connecting said bypass port and the other end of said valve bore, and said pressure relief valve means being located in said relief valve bore for normally closing said one end of the latter from said vent port.

10. In the combination according to claim 8, a portion of said fluid passage means comprising a fluid passage bore in said housing, a tubular insert coaxially in the latter bore and having at its downstream end a first metering orifice opening axially endwise into said delivery end of said fluid passage means and comprising said first metering restriction means, a second metering orifice in the sidewall of said tubular insert connecting said passage means with said upstream secondary port and comprising said secondary metering restriction means.

11. In the combination according to claim 10, said intermediate bore portion being spaced between said secondary land and third land, said valve element having a relief valve bore opening at one end into said downstream bore portion, a radial vent port in said valve element connecting said bypass port and the other end of said valve bore, and said pressure relief valve means being located in said relief valve bore for normally closing said one end of the latter from said vent port when the pressure in said downstream bore portion is less than said predetermined pressure.

References Cited

UNITED STATES PATENTS

| | | | |
|---|---|---|---|
| 2,977,888 | 4/1961 | Livermore | 137—117 X |
| 3,253,607 | 5/1966 | Drutchas | 137—117 |
| 3,314,495 | 4/1967 | Clark et al. | 137—117 X |
| 3,320,968 | 5/1967 | Nuss | 137—117 |

STANLEY N. GILREATH, *Primary Examiner.*